Feb. 20, 1923.                                                              1,446,013
J. L. LAWRENCE ET AL
TICKET DATER
Filed Nov. 2, 1921                          4 sheets-sheet 1

Witnesses
Geo. A. Gruss
Augustus B. Coppes

Inventors
Joseph L. Lawrence
Charles H. Westacott
By Joshua R.H. Potts
their Attorney Feb. 20, 1923.  
J. L. LAWRENCE ET AL  
TICKET DATER  
Filed Nov. 2, 1921

Witnesses  
Geo. A. Gruss  
Augustus B. Coppee

Inventors  
Joseph L. Lawrence  
Charles H. Westacott  
By Joshua R. H. Potts  
their Attorney Feb. 20, 1923.

J. L. LAWRENCE ET AL 1,446,013

TICKET DATER

Filed Nov. 2, 1921

Witnesses
Geo. A. Gruss
Augustus B. Coppes

Inventors
Joseph L. Lawrence
Charles H. Westacott
By Joshua R. H. Potts
their Attorney Feb. 20, 1923. 1,446,013
J. L. LAWRENCE ET AL
TICKET DATER
Filed Nov. 2, 1921 4 sheets-sheet 4
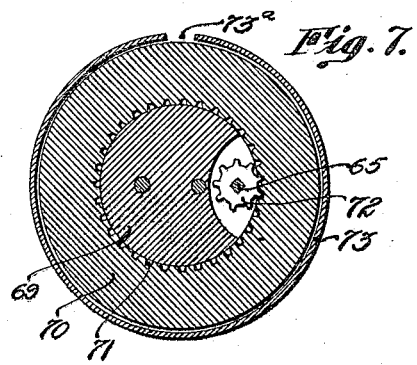
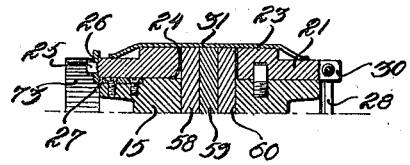
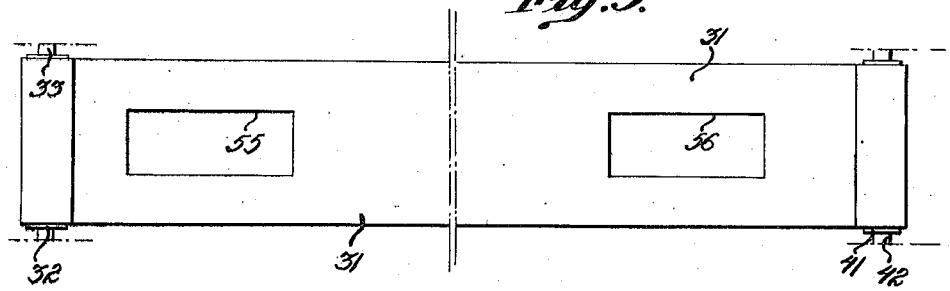
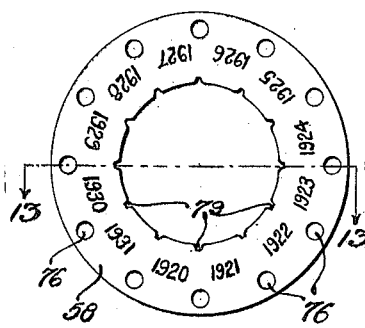
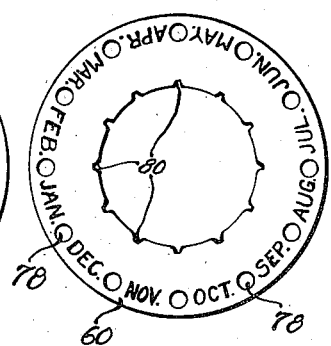

Patented Feb. 20, 1923.

1,446,013

UNITED STATES PATENT OFFICE.

JOSEPH L. LAWRENCE, OF PHILADELPHIA, PENNSYLVANIA, AND CHARLES H. WESTACOTT, OF RIVERTON, NEW JERSEY.

TICKET DATER.

Application filed November 2, 1921. Serial No. 512,172.

*To all whom it may concern:*

Be it known that we, JOSEPH L. LAWRENCE and CHARLES H. WESTACOTT, citizens of the United States, residing at Philadelphia, county of Philadelphia, and State of Pennsylvania, and Riverton, county of Burlington, and State of New Jersey, have invented certain new and useful Improvements in Ticket Daters, of which the following is a specification.

One object of our invention is to provide apparatus which can be used with advantage by railroad ticket agents or other persons whose business it is to rapidly and accurately date and dispense numerous tickets and who are often called upon to date tickets ahead of the sales date.

Another object is to so construct and arrange the parts of our invention that they can be quickly, easily and accurately actuated and so that little time will be required to operate the parts.

A further object is to make the parts of our invention of a durable construction.

These objects, and other advantageous ends which will be described hereinafter, we attain in the following manner, reference being had to the accompanying drawings in which—

Figure 1 is an elevation of one side of a ticket dater embracing the parts of our invention, Figure 2 is a sectional plan view taken on the line 2—2 of Figure 1, Figure 3 is a fragmentary elevation of the opposite side of said ticket dater, Figure 4 is a sectional plan view taken on the line 4—4 of Figure 3, Figure 5 is a sectional elevation taken on the line 5—5 of Figure 4, Figure 6 is an enlarged fragmentary sectional plan view taken on the line 6—6 of Figure 5, Figure 7 is a section taken on the line 7—7 of Figure 4, Figure 8 is a fragmentary section taken on the line 8—8 of Figure 5.

Figure 9 is a plan view showing an inking ribbon which we preferably employ,

Figures 10, 11 and 12 are respectively face views of year, date and month wheels which we preferably employ, and Figure 13 is a section taken on the line 13—13 of Figure 10.

Figure 1:
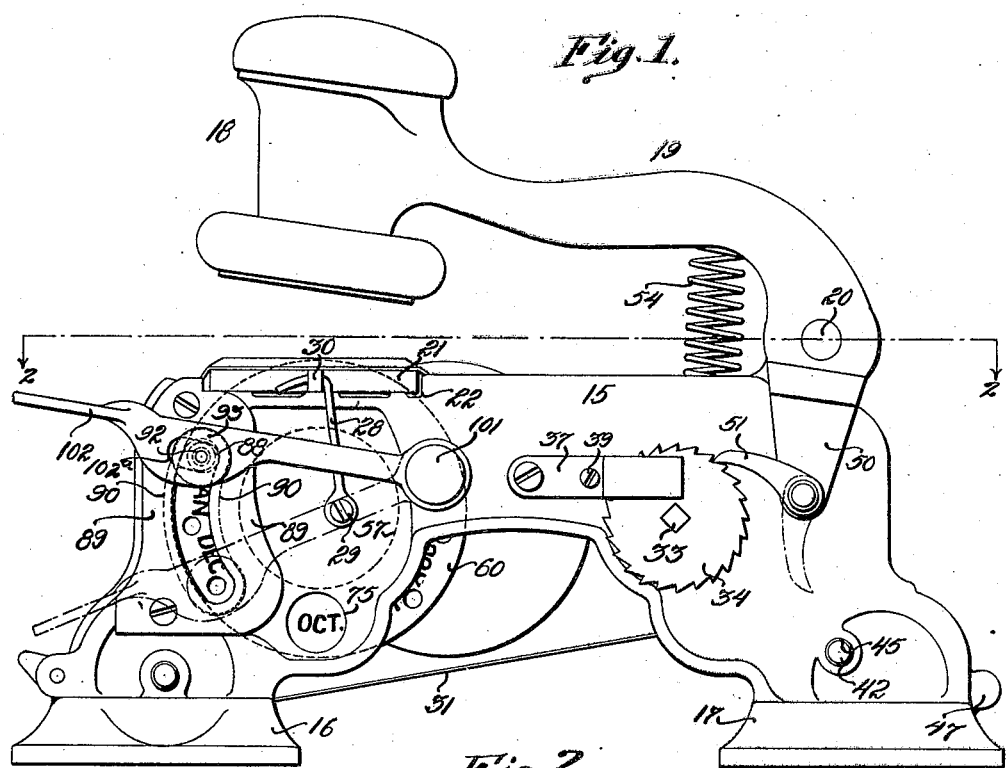

Referring to the drawings, 15 represents a frame which may be made of cast metal and includes leg portions 16 and 17 upon which the frame stands. A stamping head 18 is located on an arm 19 which is pivoted by a pivot pin 20 to the rear of the frame; said stamping head being directly over a die plate 21 which fits within a recess 22 in the top of the frame. The die plate has a raised stamping die 23 thereon and is provided with an opening 24 through which the upper peripheral portions of year, date and month wheels project as will be described more specifically hereinafter.

One end of the die plate has a pin 25 which projects through a hole 26 in an ear 27 on one side of the frame and a hook 28 which is pivoted at 29 to the opposite side of the frame engages within a perforated ear 30 at the opposite side of the die plate from the pin 25. Thus in order to remove the die plate, it is merely necessary to swing the hook on its pivot 29 and to slide the die plate out of the recess 22.

An inking ribbon 31 extends over the top of the die plate and has one end wound on a roller 32; said roller being mounted on a shaft 33 which is journaled in the opposite sides of the frame. One end of the shaft 33 has a ratchet wheel 34 thereon and a coiled spring 35 is interposed between the ratchet wheel 34 and the adjacent side of the frame. The opposite end of the shaft 33 is grooved and within the groove is a spring ring 36 so as to limit the lengthwise movement of the shaft 33 by the spring 35.

Figure 2:
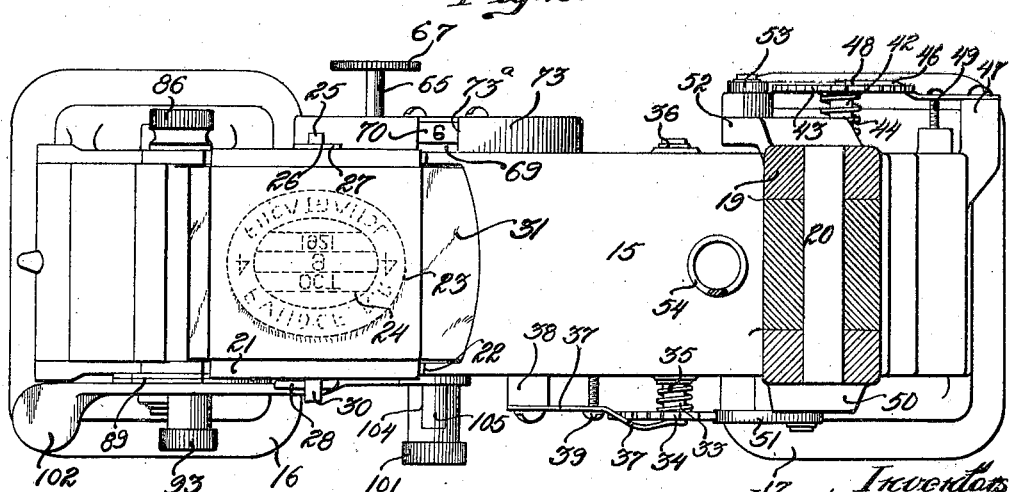
Figure 3:
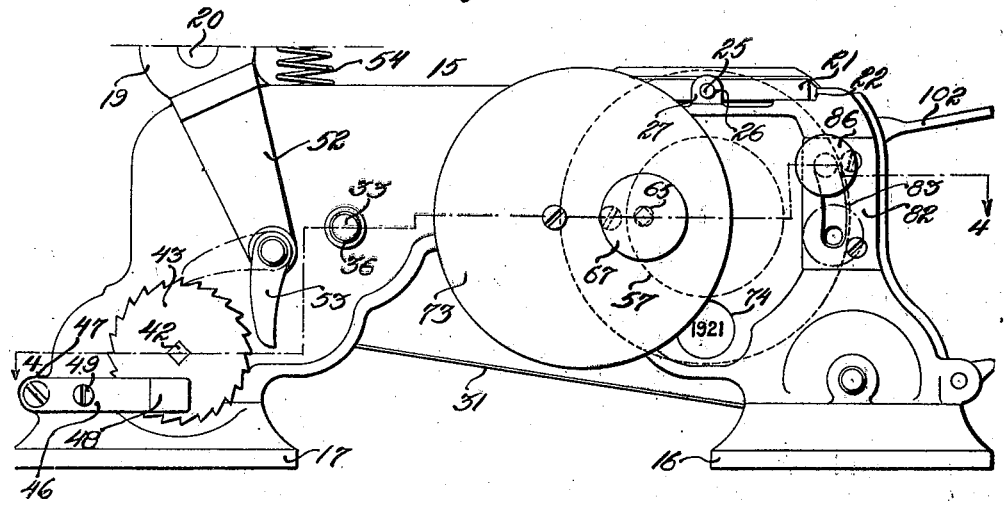
Figure 5:
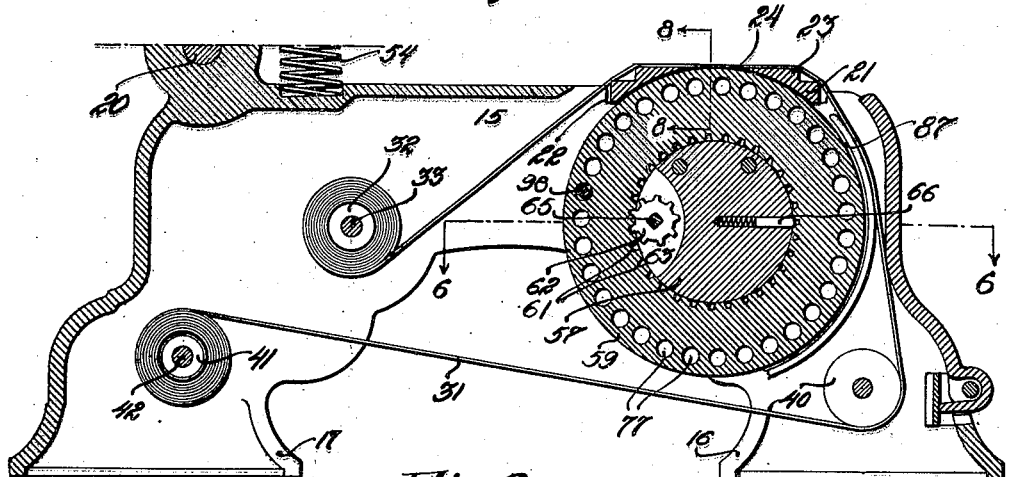

A frictional detent spring 37 is secured by a screw to a lug 38 on one side of the frame; said frictional detent spring having a portion frictionally bearing on the outer side surface of the ratchet wheel 34. A screw 39 extends through the detent spring 37 and engages a tapped hole in the side of the frame so that by turning the screw 39 various degrees of pressure can be secured by the spring against the side surface of the ratchet wheel. The inking ribbon 31 extends upwardly from the roller 32 over the die plate as above stated and then down through the front portions of the frame and around an idler roller 40 and then is wound upon a roller 41 which is mounted on a shaft 42 as clearly shown in Figure 5. The shaft 42 has a bearing in the opposite side of the frame 15 and has a ratchet wheel 43 secured thereto adjacent the opposite side of the frame 15 as shown in Figure 2.

A coiled spring 44 is interposed between the ratchet wheel 43 and the adjacent side surface of the frame and the opposite portion of the shaft 42 is grooved to receive a spring ring 45 so as to limit the movement of the shaft 42 in the direction of its length. A second frictional detent spring 46 is secured to a lug 47 and has a portion 48 frictionally engaging the outer side surface of the ratchet wheel 43.

An adjusting screw 49 extends through a hole in the detent 46 and engages a tapped hole in the adjacent side of the frame so that by turning the screw 49 the detent 46 can be made to bear with varying degrees of friction against the side surface of the ratchet wheel. The teeth of the ratchet wheels 34 and 44 point in opposite directions for a purpose hereinafter made obvious. The arm 19 at one side of the frame has a depending extension 50 to which is pivotally connected a pawl 51 for engagement with the ratchet wheel 34. In like manner the arm 19 has another depending extension 52 adjacent the opposite side of the frame and to this extension 52 is pivotally secured a pawl 53. A coiled spring 54 is interposed between the under part of the arm 19 and the top portion of the frame and normally tends to raise said arm and hold it in a raised position as shown in Figure 1.

During the use of the device it will be understood that the pawl 51 can be moved into operating engagement with the ratchet wheel 34 or the pawl 53 can be moved into operating position with the ratchet 43, but that the pawls cannot both be in operating position at the same time for reasons hereinafter rendered obvious.

As shown in Figure 9, the inking ribbon 31 has holes or apertures 55 and 56; these apertures being located adjacent the opposite ends of the ribbon; there being sufficient of the ribbon between said apertures and the ends however to allow a certain number of windings of the ribbon on the rollers. These apertures serve as signal means to the operator of the device to inform the operator when one end of the ribbon has nearly been unwound from its roller.

In so far as the operation of the inking ribbon is concerned the device operates as follows: During the use of the device the tickets are placed above the die and the stamping head is lowered; one of the pawls being thrown into engagement with its respective wheel. The resulting action is that during the movement of the arm said pawl will actuate the ratchet wheel and the inking ribbon will be intermittently moved so as to bring fresh portions over the die for each stamping action of the head. The device can continue to operate until one of the apertures 55 or 56 appears adjacent the die and the operator will then know that it is time to reverse the movement of the ribbon and the previously operating pawl can be released and the other pawl can be thrown into operation and the subsequent action of the arm will effect a movement of the ribbon in an opposite direction. This action can be repeated until the other of the apertures in the ribbon appears and then the operator can again change the pawls to effect the operation of the ribbon in an opposite direction. By the arrangement of the detent springs the ribbon can always be kept at a desired tension so that there will be practically no lost motion caused by the overrunning of the rollers.

A cylindrical core 57 is rigidly supported within the frame 15 at a position below the die recess 22 and this core 57 serves as a bearing support for three wheels 58, 59 and 60. These wheels are placed side by side; the peripheral surface of the wheel 58 having year dates thereon in the form of integral type; the peripheral surface of the wheel 59 having month dates thereon in the form of integral type and the wheel 60 having abbreviated names of the months of the year thereon in the form of type. In other words, the wheel 58 constitutes the year wheel, the wheel 59 constitutes the day date wheel and the wheel 60 constitutes the month wheel. These wheels have their upper portions extending into the die opening 24 as above stated. The wheel 59 has internal notches 61 annularly arranged and it will be considered that there is one of these notches for each day in the month of thirty-one days. A pinion 62 is adapted to engage the notches 61; said pinion being located in a recess 63 in the core 57. A shaft 65 extends through the frame and the pinion 62 is operatively connected to the shaft 65. The core 57 has a spring-pressed plunger 66 adapted to be moved into holding engagement with the notches 61 as the wheel 59 is rotated as will be described hereinafter. However, the plunger 66 is so shaped at its end that when power is applied rotatably to the shaft 65 that the plunger 66 will be forced back to permit the rotation of the wheel 59 by the action of the shaft 65. The shaft 65 has a knob or handle 67 thereon to facilitate the rotation thereof and the wheel 59 can be rotated to bring any one of the date numbers uppermost in a position within the opening 24 of the die.

In view of the fact that the die is normally covered by the inking ribbon, we have provided means which will enable the operator to quickly see which date of the wheel 59 is uppermost; said means being as follows: A cylindrical core 69 is secured to one side of the frame and supports a wheel 70 which is substantially the same as the wheel 59; the same including notches 71 with which the teeth of a pinion 72 on the shaft 65 mesh. A housing 73 for the wheel 70 has an opening 73ᵃ at its top through which the numbers on the peripheral surface of the wheel 70 can be seen. The numbers on the peripheral surface of the wheel 70 are arranged similarly to the date numbers on the wheel 59 so that, for example if the number 9 of the wheel 59 is uppermost the number 9 on the wheel 70 will be uppermost and visible through the opening 73ᵃ. The outer side surface of the wheel 58 is also provided with the year dates and these dates are visible through an aperture 74 in one side of the frame; the arrangement of the numbers on the side surface of the wheel 58 being so arranged with the type numbers on the peripheral surface that the number appearing at the opening 74 will indicate that the same number on the peripheral surface is uppermost. In like manner, the outer side surface of the wheel 60 has abbreviated names of the months thereon; said names being visible through an aperture 75 so that if it is desired to determine which month name is uppermost it is merely necessary to look through the aperture 75. The year wheel 58 has a number of holes 76 extending transversely therethrough in annular arrangement; there being as many of the holes 76 as there are year dates on the wheel. These holes 76 are all internally screw threaded for a purpose hereinafter described. The day date wheel 59 has a number of holes 77 extending transversely therethrough and in annular arrangement; there being as many of these holes as there are day dates on the wheel. Also the month name wheel 60 has a number of transversely extending holes 78 arranged in annular formation; there being as many of these holes 78 as there are month names on the wheel 60. The transversely extending holes of each of the wheels are at the same distance from the common axis of the wheels and the holes of one wheel are capable of registration with the holes of the other wheels.

The year wheel 58 has internal notches 79; there being one notch for each of the year dates on the wheel. In like manner the wheel 60 has internal notches 80; there being as many notches 80 as there are month names on the wheel. Spring-pressed plungers within the core 57 are adapted to respectively engage the notches 79 and 80 of the wheels 58 and 60 in the same manner as described in connection with the plunger 66 and the notches 61.

One side of the frame 15 has a slot 81 therein and a plate 82 is secured preferably by screws to said frame adjacent the slot 81; said plate 82 having a slot 83 therein narrower than the slot 81; said slots 81 and 83 being concentric to the common axis of the wheels 58, 59 and 60. A spindle 84 extends through the slots 81 and 83 and has a screw threaded inner end adapted to be screwed into any one of the holes 76 in the wheel 58. The spindle 84 has an enlarged portion 85 of greater diameter than the width of the slot 83 but of less diameter than the width of the slot 81. A knob 86 is secured to the outer end of the spindle to allow for the rotation of the spindle to permit the screwing of said portion of the spindle into any one of the holes 58 which are in registry with the slot 83 so that by screwing the spindle into any one of the holes in the wheel 58 the spindle will be secured to said wheel and can be moved by the aid of the handle by moving the spindle bodily in the direction of the slot 83 and thus various year dates can be moved into their uppermost position in registry with the die opening 24. The slot 83 is of such length that in moving the spindle from one end to the other the wheel 58 will be rotated to the extent of the distance between one year date and an adjacent year date so that if the operator desires to date a ticket a year ahead he can readily do so by the bodily movement of the spindle and when having finished the operation a reverse bodily movement of the spindle will return the current year date into registration with the die opening.

Figure 4:
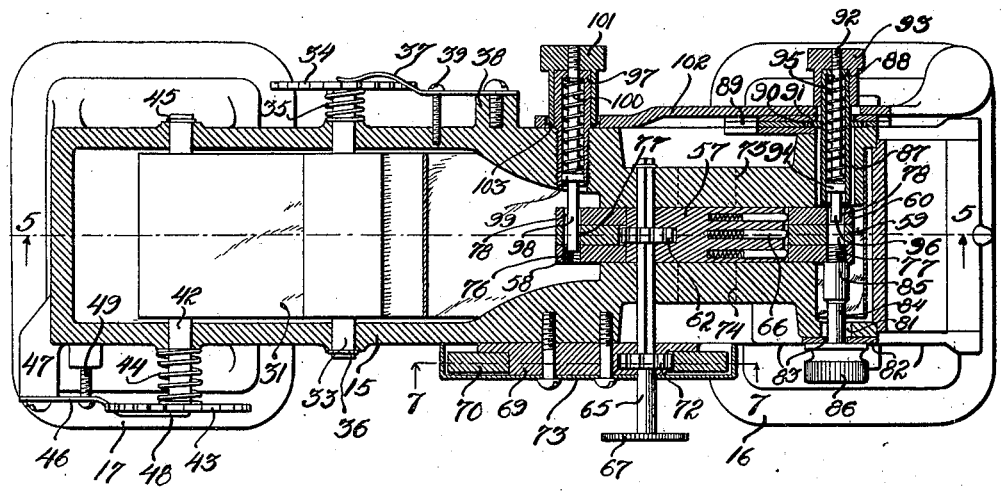

The opposite side of the frame has a slot 87 which extends concentric to the common axis of the wheels 58, 59, and 60, and a hollow bushing 88 extends within the slot 87. Plates 89 are detachably secured to said latter side of the frame and provide the undercut slot 90 in which extends a flange 91 of the bushing 88. A rod 92 extends through the bushing and at its outer end is screwed into a cap 93; said cap partly surrounding the bushing as clearly shown in Figure 4. The rod 92 has an enlarged flange 94 slidably fitting the bushing and a coiled spring 95 is interposed between the flange 94 and the outer closed end of the bushing. The inner end 96 of the rod 92 is adapted to project into any of the holes 78 of the month name wheel 60. Thus by pulling outward on the cap 93, the rod 92 will be moved against the action of the spring 95 so as to withdraw the end 96 of the rod 92 out of engagement with the alighed hole 78 of the wheel 60. After this withdrawal action the entire structure including the bushing can be moved bodily in the direction of the length of the slot until the rod 92 becomes in alignment with another of the hole 78 and upon release of the cap 93 the spring 95 will move the rod into said latter hole. Then by moving the bushing and pin bodily the wheel 60 can be moved so as to bring any desired month into registry with the die opening 24. The slot 87 is preferably made of such length that a movement of the bushing from one end of the slot to the other will effect the movement of two months. However, if it is only desired to move one month, the same can be done by withdrawing the rod 92 from one hole and moving it into the next nearest hole 78 and then moving the bushing bodily to the end of the slot in either direction according to whether it is desired to date in advance or rearward.

As means for locking all of the wheels 58, 59 and 60 together we provide the following mechanism. A bushing 97 is screwed into one side of the frame and has a rod 98 slidable therein; said rod having a flange 99 slidable within the bushing. A coil spring 100 is interposed between the flange 99 and the outer closed end of the bushing 97. The outer end of the rod 98 is screwed into a cap 101 which slidably fits over the outer end of the bushing. A lever 102 pivotally surrounds the bushing and has a flange 103 adapted to engage between the inner end of the cap and the adjacent side of the frame 15.

Figure 6:
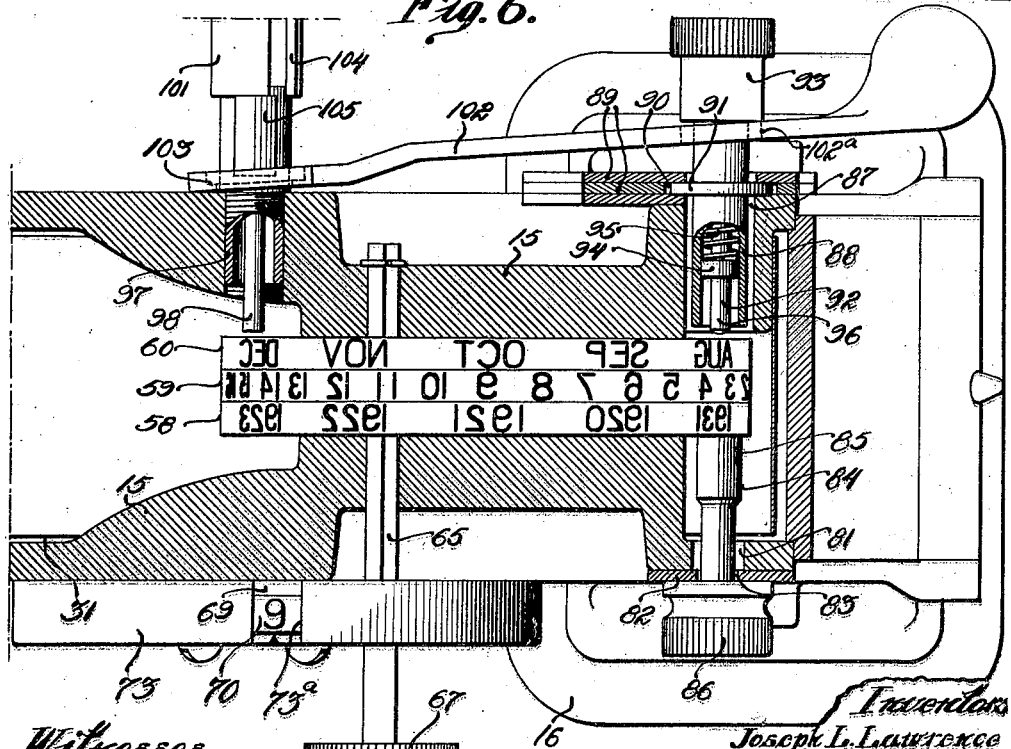

It will be noted that the rod 98 normally locks all of the wheels 58, 59 and 60 against rotation and before any of these wheels can be rotated, the rod 98 must be withdrawn. This withdrawal movement can be accomplished by pulling outward on the cap 101. The side of cap 101 has a slot 104 into which a projection or key 105 on the bushing 97 normally fits. By pulling the cap 101 outward until its free end passes the outer end of the projection 105 the cap can be slightly rotated so that its inner end can be moved into engagement with the end of the projection 105 as shown in Figure 6. This pulling action of the cap compresses the spring 100 and when the cap is moved into the position shown in Figure 6 the pin will be held in its withdrawn position but when the cap 101 is turned so that its slot 104 registers with the projection 105, the spring 100 will pull the cap toward the frame and the rod 98 will be projected into aligned holes in the wheels 58, 59 and 60.

When our improved device is used in ticket offices, such for example as railroad ticket offices where each clerk is responsible for the tickets sold, each of the clerks can have a separate die plate with a marking thereon such for example as the number 4 shown on the die plate in Figure 2 and when the clerk finishes his work he can remove his die plate from the recess 22 as above described and the clerk who relieves him can insert his die plate in the recess. In this manner the tickets which are dated will have the numbers of the respective clerks so that if there is any error in the dating of a ticket it can be readily traced to the clerk who actually dated that ticket. Furthermore when there are a great number of persons waiting in line to receive tickets the clerks will not be required to take time to change a ribbon as now is necessary when the end of the ribbon approaches the die, since the apertures 55 or 56 serve as signals to inform the clerk that the reverse movement of the inking ribbon is necessary and this can be done quickly and at the same time the mechanism insures an even movement and a smooth portion of the ribbon over the die and type wheels. It will be further noted that the wheel 60 can be moved through the medium of the lever 102 since if it is desired to move the month name wheel one month ahead it is only necessary to move the lever to the extent of the distance between two of the adjacent holes 78 and to return said wheel to its normal position it is merely necessary to actuate the lever 102 in an opposite direction. In fact the month name wheel can be moved to any extent and if it is necessary to move the same to a distance greater than two months, the rod 92 can be withdrawn and then moved bodily so as to engage in a hole in the wheel 60 at the opposite end of the slot 87 and then moved either by the movement of the cap 93 or lever 102.

It will be noted that the lever 102 is mounted loosely in a position surrounding the bushing 97 so that the lever 102 can be swung outward into the position shown in Figure 6; said lever being operative to engage the cap 93 and pull it outward so that the lever 102 can be used for the purpose of withdrawing the rod 92. The lever 102 has a slot 102$^a$ through which the bushing 88 extends; said slot 102$^a$ being slightly narrower than the diameter of the cap 93.

The year wheel 58 can be moved by the mechanism above described merely by unscrewing the spindle and moving it in the adjacent holes or if a movement to the extent of one year is desired it is merely necessary to move the spindle to the extent of the length of the slot 83.

In using the device for the actual dating operation the same is used by inserting the tickets or other articles between the stamping head and the portion of the inking ribbon over the die and type wheels and by striking downward upon the head 18 the latter will descend and force the ticket into engagement with the die so as to leave the imprint of the type on the ticket. Upon release of the stamping head the spring 54 will move the stamping head upward into its normal position.

While we have described our invention as taking a particular form, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:—

1. Apparatus of the character described including a frame; a type wheel having holes therein and rotatably mounted within the frame; means movably connected to said frame and including a rod adapted to be projected into said holes and moved bodily to effect the rotation of said wheel; and means for limiting the bodily movement of said rod to predetermined extents during the rotatable movement of said wheel; substantially as described.

2. Apparatus of the character described including a frame; a type wheel therein having holes, said frame including a portion providing a slot for registration with a number of said holes; and means adapted to be projected into said holes through the medium of said slot and bodily movable to effect the rotation of said type wheel; substantially as described.

3. Apparatus of the character described including a frame; a type wheel therein having holes, said frame including a portion providing a slot for registration with a number of said holes; a lever; and a rod carried by said lever and adapted to be projected into said holes whereby when the lever is moved the wheel will be rotated; substantially as described.

4. Apparatus of the character described including a frame; a type wheel mounted within said frame and having holes thereon; a lever movably connected to said frame; and a rod carried by said lever and adapted to be projected into said holes whereby when the lever is moved the rod will be moved to rotate said wheel; substantially as described.

5. Apparatus of the character described including a frame having a portion providing a slot; a type wheel in said frame having holes for registry with said slot; and a spring-pressed rod movably connected to said frame and adapted to be projected into said holes in the wheel through the medium of said slot whereby a lateral movement of said rod will effect a rotatable movement of said type wheel; substantially as described.

6. Apparatus of the character described including a frame; a type wheel mounted within the frame and having holes, said frame having a portion providing a slot for registry with a number of said holes; a spring-pressed rod movable laterally in a path substantially concentric to the axis of said wheel; and a lever movably connected to said frame and having a slot through which said spring-pressed rod extends whereby said lateral movement of the rod can be effected through the medium of said lever; substantially as described.

7. Apparatus of the character described including a frame; a type wheel therein and having screw threaded holes spaced apart, said frame having a slot for registry with a number of said holes; and means extending into the frame through said slot and having a screw threaded portion for engagement with said holes, said latter means having a part extending outside of the frame whereby it can be moved bodily to effect a rotation of said wheel; substantially as described.

8. Apparatus of the character described including a frame; a wheel within the frame having type dates thereon adapted to be respectively moved into a printing position; inking means for covering said date types when in said position; a second wheel having dates thereon corresponding to the type dates on said first wheel; means forming a covering for said second wheel with the exception of having an opening therein of such width as to reveal each of the dates if moved in registry therewith; and operating means common to both of said wheels; substantially as described.

9. Apparatus of the character described including a frame; a wheel within the frame having type dates thereon adapted to be respectively moved into a printing position; inking means for covering said date types when in said position; a second wheel having dates thereon corresponding to the type dates on said first wheel; means forming a covering for said second wheel with the exception of having an opening therein of such width as to reveal each of the dates if moved in registry therewith, said wheels having internal notches; a shaft; and gear wheels on said shaft adapted to mesh with said notches whereby when the shaft is rotated the first mentioned wheels will be rotated; substantially as described.

10. Apparatus of the character described including type rollers arranged side by side and having holes adapted to register with each other; a rod adapted to be projected through registering holes to lock them together; means providing a mounting and having a projection; and a portion connected to said rod having a slot for registration with said projecting portion so that the rod can be withdrawn and the slotted part moved out of alignment with said projecting portion to hold the rod in a withdrawn position; substantially as described.

11. Apparatus of the character described including type rollers arranged side by side and having holes adapted to register with each other; a rod adapted to be projected through registering holes to lock them together; means providing a mounting and having a projection; a portion connected to said rod having a slot for registration with said projecting portion so that the rod can be withdrawn and the slotted part moved out of alignment with said projecting portion to hold the rod in a withdrawn position; and a spring for moving said rod into said locking position; substantially as described.

12. Apparatus of the character described including a frame; type means on said frame; rollers supported by said frame; an inking ribbon extending across said type means and having portions respectively wound on said rollers; stamping means movably secured to said frame; ratchet wheels secured to said rollers; pawls movably connected to said stamping means and adapted to be alternately moved into engagement with the said ratchet wheels whereby when one of the ratchet wheels is moved by its pawl the ribbon will be moved in one direction and when the other ratchet wheel is engaged by its pawl the inking ribbon will be moved in an opposite direction; and frictional detent springs having a bearing on the sides of said ratchet wheels; substantially as described.

13. Apparatus of the character described including a frame; type means on said frame; rollers supported by said frame; an inking ribbon extending across said type means and having portions respectively wound on said rollers; stamping means movably secured to said frame; ratchet wheels secured to said rollers; pawls movably connected to said stamping means and adapted to be alternately moved into engagement with the said ratchet wheels whereby when one of the ratchet wheels is moved by its pawl the ribbon will be moved in one direction and when the other ratchet wheel is engaged by its pawl the inking ribbon will be moved in an opposite direction; frictional detent springs having a bearing on the sides of said ratchet wheels; and adjusting means for varying the degree of friction of said detent springs upon said ratchet wheels; substantially as described.

14. Apparatus of the character described including a frame; type means on said frame; rollers supported by said frame; an inking ribbon extending across said type means and having portions respectively wound on said rollers; stamping means movably secured to said frame; ratchet wheels secured to said rollers; pawls movably connected to said stamping means and adapted to be alternately moved into engagement with the said ratchet wheels whereby when one of the ratchet wheels is moved by its pawl the ribbon will be moved in one direction and when the other ratchet wheel is engaged by its pawl the inking ribbon will be moved in an opposite direction; frictional detent springs having a bearing on the sides of said ratchet wheels; adjusting means for varying the degree of friction of said detent springs upon said ratchet wheels; and springs interposed between said frame and the opposite sides of said ratchet wheels; substantially as described.

15. Apparatus of the character described including a frame; type means on said frame; rollers supported by said frame; an inking ribbon extending across said type means and having portions respectively wound on said rollers, the ribbon having signal parts to indicate when the ribbon is nearly unwound from either roller; stamping means movably secured to said frame; ratchet wheels secured to said rollers; pawls movably connected to said stamping means and adapted to be alternately moved into engagement with the said ratchet wheels whereby when one of the ratchet wheels is moved by its pawl the ribbon will be moved in one direction and when the other ratchet wheel is engaged by its pawl the inking ribbon will be moved in an opposite direction; and frictional detent springs having a bearing on the sides of said ratchet wheels; substantially as described.

In testimony whereof we have signed our names to this specification in the presence of two subscribing witnesses.

JOSEPH L. LAWRENCE.
CHAS. H. WESTACOTT.

Witnesses:
ELIZABETH GARBE,
CHAS. E. POTTS.